United States Patent (10) Patent No.: US 9,652,816 B1
Holland et al. (45) Date of Patent: May 16, 2017

(54) REDUCED FRAME REFRESH RATE

(71) Applicant: Apple Inc., Cupertino, CA (US)

(72) Inventors: Peter F. Holland, Los Gatos, CA (US); Brijesh Tripathi, Los Altos, CA (US); Joshua P. de Cesare, Campbell, CA (US); Arthur L. Spence, San Jose, CA (US); Christopher P. Tann, San Jose, CA (US); Paolo Sacchetto, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/500,570

(22) Filed: Sep. 29, 2014

(51) Int. Cl.
*G06T 13/00* (2011.01)
*G06T 1/20* (2006.01)

(52) U.S. Cl.
CPC .............. *G06T 1/20* (2013.01); *G06T 13/00* (2013.01); *G06T 2200/28* (2013.01); *G09G 2330/021* (2013.01); *G09G 2340/0435* (2013.01); *G09G 2360/18* (2013.01)

(58) Field of Classification Search
CPC .... H04N 5/783; H04N 7/0127; H04N 19/107; H04N 21/44004; H04N 21/440281; G09G 2340/0435; G09G 2330/021; G09G 2360/18; G06T 13/00
See application file for complete search history.

(56) References Cited

U.S. PATENT DOCUMENTS

| 5,537,650 | A | 7/1996 | West et al. |
|---|---|---|---|
| 5,615,376 | A | 3/1997 | Ranganathan |
| 6,011,546 | A | 1/2000 | Bertram |
| 6,298,370 | B1 | 10/2001 | Tang et al. |
| 6,938,176 | B1 | 8/2005 | Alben et al. |
| 8,117,481 | B2 | 2/2012 | Anselmi et al. |
| 8,767,777 | B2 | 7/2014 | Kobayashi |
| 9,116,639 | B2 | 8/2015 | Tripathi |
| 2008/0212729 | A1 | 9/2008 | Shaanan |
| 2009/0196209 | A1 | 8/2009 | Haartsen |

(Continued)

FOREIGN PATENT DOCUMENTS

| EP | 2211510 B1 | 8/2011 |
|---|---|---|
| EP | 2428878 A2 | 3/2012 |
| WO | 2014032385 A1 | 3/2014 |

OTHER PUBLICATIONS

International Search Report and Written Opinion from PCT/US2013/075665, mailed May 19, 2014, Apple Inc., 10 pages.

(Continued)

*Primary Examiner* — Jeffrey Chow
(74) *Attorney, Agent, or Firm* — Rory D. Rankin; Meyertons, Hood, Kivlin, Kowert & Goetzel, P.C.

(57) ABSTRACT

Systems, apparatuses, and methods for adjusting the frame refresh rate used for driving frames to a display. A display pipeline is configured to drive a display using a reduced frame refresh rate in certain scenarios. The reduced frame refresh rate may be specified in frame packets which contain configuration data for processing corresponding frames. The display pipeline may drive idle frames to the display to generate the reduced frame refresh rate. When a touch event is detected, the display pipeline may override the reduced frame refresh rate and instead utilize a standard frame refresh rate until all of the frames corresponding to stored frame packets have been processed.

17 Claims, 9 Drawing Sheets

(56) References Cited

U.S. PATENT DOCUMENTS

| | | | |
|---|---|---|---|
| 2010/0237847 A1 | 9/2010 | Finney | |
| 2011/0169848 A1* | 7/2011 | Bratt | G09G 5/363 |
| | | | 345/545 |
| 2011/0292059 A1 | 12/2011 | Kobayashi | |
| 2011/0299512 A1 | 12/2011 | Fukuda | |
| 2012/0068994 A1 | 3/2012 | Li et al. | |
| 2012/0317607 A1 | 12/2012 | Wyatt et al. | |
| 2013/0021352 A1 | 1/2013 | Wyatt et al. | |
| 2013/0057511 A1 | 3/2013 | Shepelev et al. | |
| 2013/0300846 A1* | 11/2013 | Miller | H04N 7/183 |
| | | | 348/65 |
| 2013/0305074 A1 | 11/2013 | Ellis et al. | |
| 2014/0071062 A1 | 3/2014 | Fang | |
| 2014/0173313 A1 | 6/2014 | Tripathi et al. | |
| 2014/0210832 A1* | 7/2014 | Wang | G09G 5/006 |
| | | | 345/520 |
| 2015/0091859 A1* | 4/2015 | Rosenberg | G06F 3/044 |
| | | | 345/174 |
| 2015/0098020 A1* | 4/2015 | Vill | H04N 5/04 |
| | | | 348/513 |
| 2015/0348496 A1* | 12/2015 | Santos, II | G06F 9/4411 |
| | | | 345/520 |
| 2015/0355762 A1 | 12/2015 | Tripathi et al. | |

OTHER PUBLICATIONS

Wiley, Craig, "eDP™ Embedded DisplayPort™: The New Generation Digital Display Interface for Embedded Applications", DisplayPort Developer Conference, Dec. 6, 2010, 30 pages.
International Search Report and Written Opinion in International Application No. PCT/US2015/030731, mailed Aug. 31, 2015, 10 pages.

* cited by examiner

REDUCED FRAME REFRESH RATE

BACKGROUND

Technical Field

Embodiments described herein relate to the field of graphical information processing and more particularly, to dynamically adjusting the frame refresh rate of a display.

Description of the Related Art

Part of the operation of many computer systems, including portable digital devices such as mobile phones, notebook computers and the like, is to employ a display device, such as a liquid crystal display (LCD), to display images, video information/streams, and data. Accordingly, these systems typically incorporate functionality for generating images and data, including video information, which are subsequently output to the display device. Such devices typically include video graphics circuitry (i.e., a display pipeline) to process images and video information for subsequent display.

In digital imaging, the smallest item of information in an image is called a "picture element," more generally referred to as a "pixel." For convenience, pixels are generally arranged in a regular two-dimensional grid. By using such an arrangement, many common operations can be implemented by uniformly applying the same operation to each pixel independently. Since each pixel is an elemental part of a digital image, a greater number of pixels can provide a more accurate representation of the digital image. To represent a specific color on an electronic display, each pixel may have three values, one each for the amounts of red, green, and blue present in the desired color. Some formats for electronic displays may also include a fourth value, called alpha, which represents the transparency of the pixel. This format is commonly referred to as ARGB or RGBA. Another format for representing pixel color is YCbCr, where Y corresponds to the luma, or brightness, of a pixel and Cb and Cr correspond to two color-difference chrominance components, representing the blue-difference (Cb) and red-difference (Cr).

Most images and video information displayed on display devices such as LCD screens are interpreted as a succession of ordered image frames, or frames for short. While generally a frame is one of the many still images that make up a complete moving picture or video stream, a frame can also be interpreted more broadly as simply a still image displayed on a digital (discrete or progressive scan) display. A frame typically consists of a specified number of pixels according to the resolution of the image/video frame. Most graphics systems use memories (commonly referred to as "frame buffers") to store the pixels for image and video frame information. The information in a frame buffer typically consists of color values for every pixel to be displayed on the screen.

A constant interval between images allows a video stream or animated image to appear to move smoothly. Without a constant interval, movement of objects and people in the video stream would appear erratic and unnatural. Before the use of LCD displays and digital video standards became common, analog cathode ray tube televisions and monitors used a signal called the Vertical Blanking Interval (VBI) to re-position the electron gun from the bottom right corner of the screen back to the top left where each video frame began. The VBI signal has continued to be present in modern video systems even though its original purpose is obsolete, and it can provide a constant interval for updating image frames.

For portable digital devices employing a display device, it is challenging to determine how to drive the display device while at the same time minimizing power consumption so as to maximize the battery life of the portable device. Therefore, new techniques for providing a positive viewing experience to the user while simultaneously minimizing power consumption are desired.

SUMMARY

Systems, apparatuses, and methods for utilizing a reduced frame refresh rate for driving a display are contemplated.

In one embodiment, an apparatus may include at least one display pipeline driving pixels to one or more displays. A display pipeline may be configured to drive pixels to a display at a standard frame refresh rate while operating in a first mode. When operating in a second mode, the display pipeline may be configured to drive pixels to the display at a reduced frame refresh rate. The display pipeline may be configured to transition between the first and second modes in response to detecting any of various conditions. For example, in one embodiment, if the apparatus detects that the display content is static, then the display pipeline may transition from the first mode to the second mode. By operating in the second mode, the display pipeline may use less power as compared to operating in the first mode.

In one embodiment, the display pipeline may drive pixels to one or more displays at a reduced frame refresh rate by inserting idle frames into the frame sequence being displayed on the display(s). The frames may be generated at the standard frame refresh rate, with frames alternating between active frames and idle frames. For example, if the display pipeline is driving active frames to the display at half the standard frame refresh rate, the display pipeline may alternate between driving active frames and idle frames to the display. In one embodiment, idle frames being generated by the display pipeline may be discarded by the display interface coupled to the display.

If the display pipeline is operating in the second mode and any of a first plurality of conditions are detected, then the display pipeline may transition from operating in the second mode to operating in the first mode. For example, in one embodiment, if a touch event is detected and the display pipeline is operating in the second mode, the display pipeline may be configured to switch to operating in the first mode so as to drive the display at the standard frame refresh rate.

In one embodiment, the display pipeline may include a parameter first-in first-out (FIFO) buffer for storing configuration packets received for subsequent frames to be displayed. When the display pipeline switches from the second mode to the first mode, the display pipeline may record the number of frame packets stored in the parameter FIFO. In one embodiment, the display pipeline may override the frame refresh rate stored in the frame packets for the recorded number of frame packets. In this way, the display pipeline will process the stored frames more quickly and thus be able to more quickly respond to the touch event or other condition which caused the display pipeline to transition from the second mode to the first mode.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
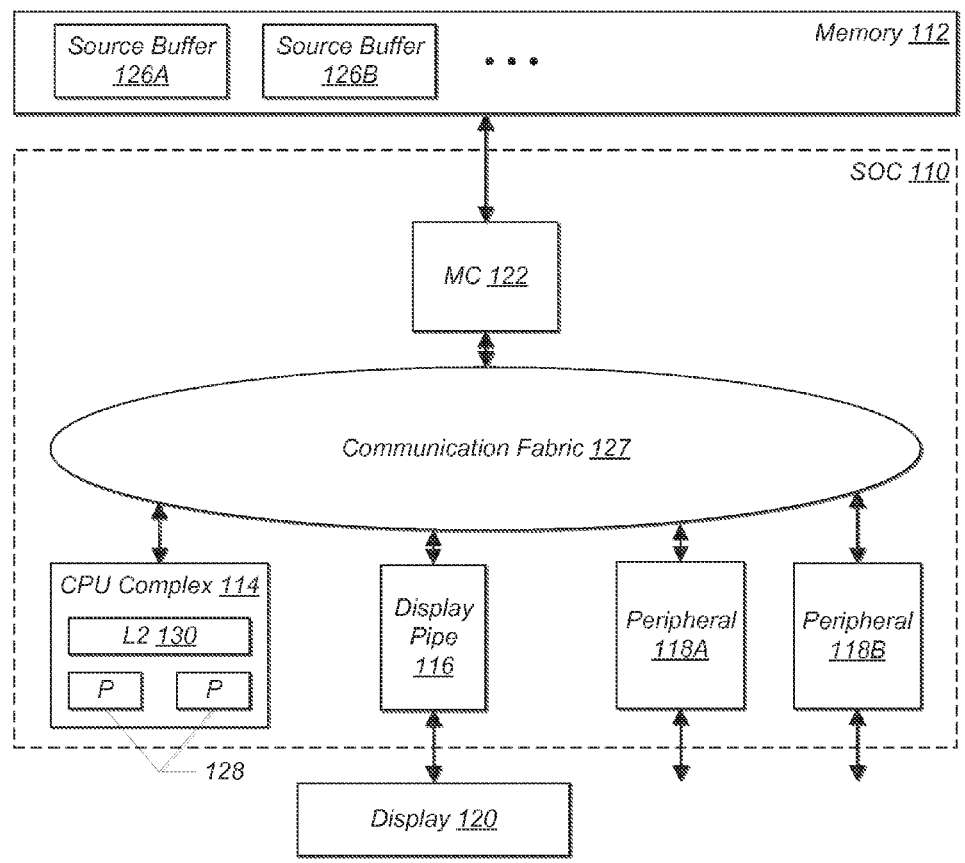
FIG. 1 is a block diagram illustrating one embodiment of a system on chip (SOC) coupled to a memory and one or more display devices.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a display pipeline . . . ." Such a claim does not foreclose the system from including additional components (e.g., a processor, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system on chip (SOC) 110 is shown coupled to a memory 112 and display device 120. A display device may be more briefly referred to herein as a display. As implied by the name, the components of the SOC 110 may be integrated onto a single semiconductor substrate as an integrated circuit "chip." In some embodiments, the components may be implemented on two or more discrete chips in a system. However, the SOC 110 will be used as an example herein. In the illustrated embodiment, the components of the SOC 110 include a central processing unit (CPU) complex 114, display pipe 116, peripheral components 118A-118B (more briefly, "peripherals"), a memory controller 122, and a communication fabric 127. The components 114, 116, 118A-118B, and 122 may all be coupled to the communication fabric 127. The memory controller 122 may be coupled to the memory 112 during use. Similarly, the display pipe 116 may be coupled to the display 120 during use. In the illustrated embodiment, the CPU complex 114 includes one or more processors 128 and a level two (L2) cache 130.

The display pipe 116 may include hardware to process one or more still images and/or one or more video sequences for display on the display 120. Generally, for each source still image or video sequence, the display pipe 116 may be configured to generate read memory operations to read the data representing respective portions of the frame/video sequence from the memory 112 through the memory controller 122.

The display pipe 116 may be configured to perform any type of processing on the image data (still images, video sequences, etc.). In one embodiment, the display pipe 116 may be configured to scale still images and to dither, scale, and/or perform color space conversion on their respective portions of frames of a video sequence. The display pipe 116 may be configured to blend the still image frames and the video sequence frames to produce output frames for display. Display pipe 116 may also be more generally referred to as a display pipeline, display control unit, or a display controller. A display control unit may generally be any hardware configured to prepare a frame for display from one or more sources, such as still images and/or video sequences.

More particularly, display pipe 116 may be configured to retrieve respective portions of source frames from one or more source buffers 126A-126B stored in the memory 112, composite frames from the source buffers, and display the resulting frames on corresponding portions of the display 120. Source buffers 126A and 126B are representative of any number of source frame buffers which may be stored in memory 112. Accordingly, display pipe 116 may be configured to read the multiple source buffers 126A-126B and composite the image data to generate the output frame.

The display 120 may be any sort of visual display device. The display 120 may be a liquid crystal display (LCD), light emitting diode (LED), plasma, cathode ray tube (CRT), etc. The display 120 may be integrated into a system including the SOC 110 (e.g. a smart phone or tablet) and/or may be a separately housed device such as a computer monitor, television, or other device.

In some embodiments, the display 120 may be directly connected to the SOC 110 and may be controlled by the display pipe 116. That is, the display pipe 116 may include hardware (a "backend") that may provide various control/data signals to the display, including timing signals such as one or more clocks and/or the vertical blanking period and horizontal blanking interval controls. The clocks may include the pixel clock indicating that a pixel is being transmitted. The data signals may include color signals such as red, green, and blue, for example. The display pipe 116 may control the display 120 in real-time or near real-time, providing the data indicating the pixels to be displayed as the display is displaying the image indicated by the frame. The interface to such display 120 may be, for example, VGA, HDMI, digital video interface (DVI), a liquid crystal display (LCD) interface, a plasma interface, a cathode ray tube (CRT) interface, any proprietary display interface, etc.

Display pipeline 116 may be configured to change the frame refresh rate at which frames are driven to the display 120. For example, display pipeline 116 may be configured to drive frames to the display 120 at a standard frame refresh rate while operating in a first mode, and display pipeline 116 may be configured to drive frames to the display 120 at a reduced frame refresh rate while operating in a second mode. In one embodiment, the standard frame refresh rate may be 60 frames per second (fps), while in other embodiments, the standard frame refresh rate may be any of various other fps values. In one embodiment, the reduced frame refresh rate may be 30 fps or another value which is divisible by 60 fps. In other words, the period of the reduced frame refresh rate may be a multiple of the period of the standard frame refresh rate in this embodiment. In other embodiments, the reduced frame refresh rate may be any of various other fps values.

While operating at the reduced frame refresh rate, display pipeline 116 may utilize less power as compared to operating at the standard frame refresh rate, thereby increasing the battery life of the host device of SOC 110. However, certain events may take place which may cause display pipeline 116 to switch from reduced frame refresh rate to the standard frame refresh rate. For example, if a touch event is detected on display 120 while display pipeline 116 is operating at the reduced frame refresh rate, then display pipeline 116 may be configured to increase the frame refresh rate by overriding the refresh rate settings in frame packets stored in a parameter First-In First-Out buffer (FIFO) (not shown). The display pipeline 116 may also be configured to override or change one or more other settings stored in the frame packets based on the current operating conditions and/or detected events. In some cases, display pipeline 116 may be configured to temporarily operate at a frame refresh rate higher than the standard frame refresh rate while processing stored frame packets. For example, if the standard frame refresh rate is 60 fps, display pipeline 116 may operate at 120 fps while processing stored frame packets in response to a touch event being detected.

The CPU complex 114 may include one or more CPU processors 128 that serve as the CPU of the SOC 110. The CPU of the system includes the processor(s) that execute the main control software of the system, such as an operating system. Generally, software executed by the CPU during use may control the other components of the system to realize the desired functionality of the system. The CPU processors 128 may also execute other software, such as application programs. The application programs may provide user functionality, and may rely on the operating system for lower level device control. Accordingly, the CPU processors 128 may also be referred to as application processors. The CPU complex may further include other hardware such as the L2 cache 130 and/or an interface to the other components of the system (e.g., an interface to the communication fabric 127).

The peripherals 118A-118B may be any set of additional hardware functionality included in the SOC 110. For example, the peripherals 118A-118B may include video peripherals such as video encoder/decoders, image signal processors for image sensor data such as camera, scalers, rotators, blenders, graphics processing units, etc. The peripherals 118A-118B may include audio peripherals such as microphones, speakers, interfaces to microphones and speakers, audio processors, digital signal processors, mixers, etc. The peripherals 118A-118B may include interface controllers for various interfaces external to the SOC 110 including interfaces such as Universal Serial Bus (USB), peripheral component interconnect (PCI) including PCI Express (PCIe), serial and parallel ports, etc. The peripherals 118A-118B may include networking peripherals such as media access controllers (MACs). Any set of hardware may be included.

The memory controller 122 may generally include the circuitry for receiving memory operations from the other components of the SOC 110 and for accessing the memory 112 to complete the memory operations. The memory controller 122 may be configured to access any type of memory 112. For example, the memory 112 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 122 may include various queues for buffering memory operations, data for the operations, etc., and the circuitry to sequence the operations and access the memory 112 according to the interface defined for the memory 112.

The communication fabric 127 may be any communication interconnect and protocol for communicating among the components of the SOC 110. The communication fabric 127 may be bus-based, including shared bus configurations, cross bar configurations, and hierarchical buses with bridges. The communication fabric 127 may also be packet-based, and may be hierarchical with bridges, cross bar, point-to-point, or other interconnects.

It is noted that the number of components of the SOC 110 (and the number of subcomponents for those shown in FIG.

1, such as within the CPU complex 114) may vary from embodiment to embodiment. There may be more or fewer of each component/subcomponent than the number shown in FIG. 1. It is also noted that SOC 110 may include many other components not shown in FIG. 1. In various embodiments, SOC 110 may also be referred to as an integrated circuit (IC), an application specific integrated circuit (ASIC), or an apparatus.

Figure 2:
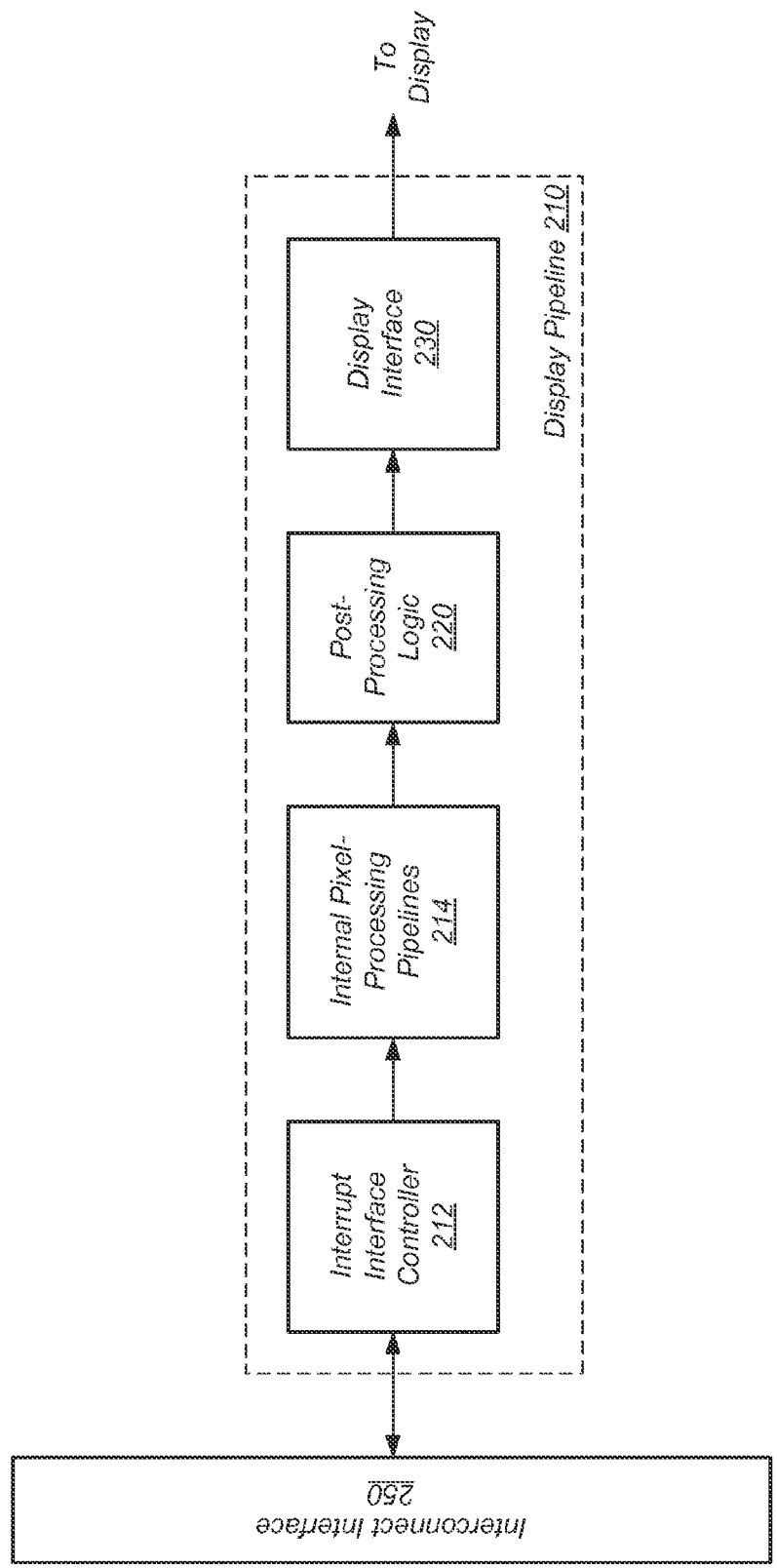
FIG. 2 is a block diagram of one embodiment of a display pipeline for use in a SOC.

Turning now to FIG. 2, a generalized block diagram of one embodiment of a display pipeline for use in a SoC is shown. Although one display pipeline is shown, in other embodiments, the host SOC (e.g., SOC 110) may include multiple display pipelines. Generally speaking, display pipeline 210 may be configured to process a source image and send rendered graphical information to a display (not shown).

Display pipeline 210 may be coupled to interconnect interface 250 which may include multiplexers and control logic for routing signals and packets between the display pipeline 210 and a top-level fabric. The interconnect interface 250 may correspond to communication fabric 127 of FIG. 1. Display pipeline 210 may include interrupt interface controller 212. Interrupt interface controller 212 may include logic to expand a number of sources or external devices to generate interrupts to be presented to the internal pixel-processing pipelines 214. The controller 212 may provide encoding schemes, registers for storing interrupt vector addresses, and control logic for checking, enabling, and acknowledging interrupts. The number of interrupts and a selected protocol may be configurable.

Display pipeline 210 may include one or more internal pixel-processing pipelines 214. The internal pixel-processing pipelines 214 may include one or more ARGB (Alpha, Red, Green, Blue) pipelines for processing and displaying user interface (UI) layers. The internal pixel-processing pipelines 214 may also include one or more pipelines for processing and displaying video content such as YUV content. In some embodiments, internal pixel-processing pipelines 214 may include blending circuitry for blending graphical information before sending the information as output to post-processing logic 220.

A layer may refer to a presentation layer. A presentation layer may consist of multiple software components used to define one or more images to present to a user. The UI layer may include components for at least managing visual layouts and styles and organizing browses, searches, and displayed data. The presentation layer may interact with process components for orchestrating user interactions and also with the business or application layer and the data access layer to form an overall solution. The YUV content is a type of video signal that consists of one signal for luminance or brightness and two other signals for chrominance or colors. The YUV content may replace the traditional composite video signal. For example, the MPEG-2 encoding system in the DVD format uses YUV content. The internal pixel-processing pipelines 214 may handle the rendering of the YUV content.

The display pipeline 210 may include post-processing logic 220. The post-processing logic 220 may be used for color management, ambient-adaptive pixel (AAP) modification, dynamic backlight control (DPB), panel gamma correction, and dither. The display interface 230 may handle the protocol for communicating with the display. For example, in one embodiment, a DisplayPort interface may be used. Alternatively, the Mobile Industry Processor Interface (MIPI) Display Serial Interface (DSI) specification or a 4-lane Embedded Display Port (eDP) specification may be used. It is noted that the post-processing logic and display interface may be referred to as the display backend.

Figure 3:
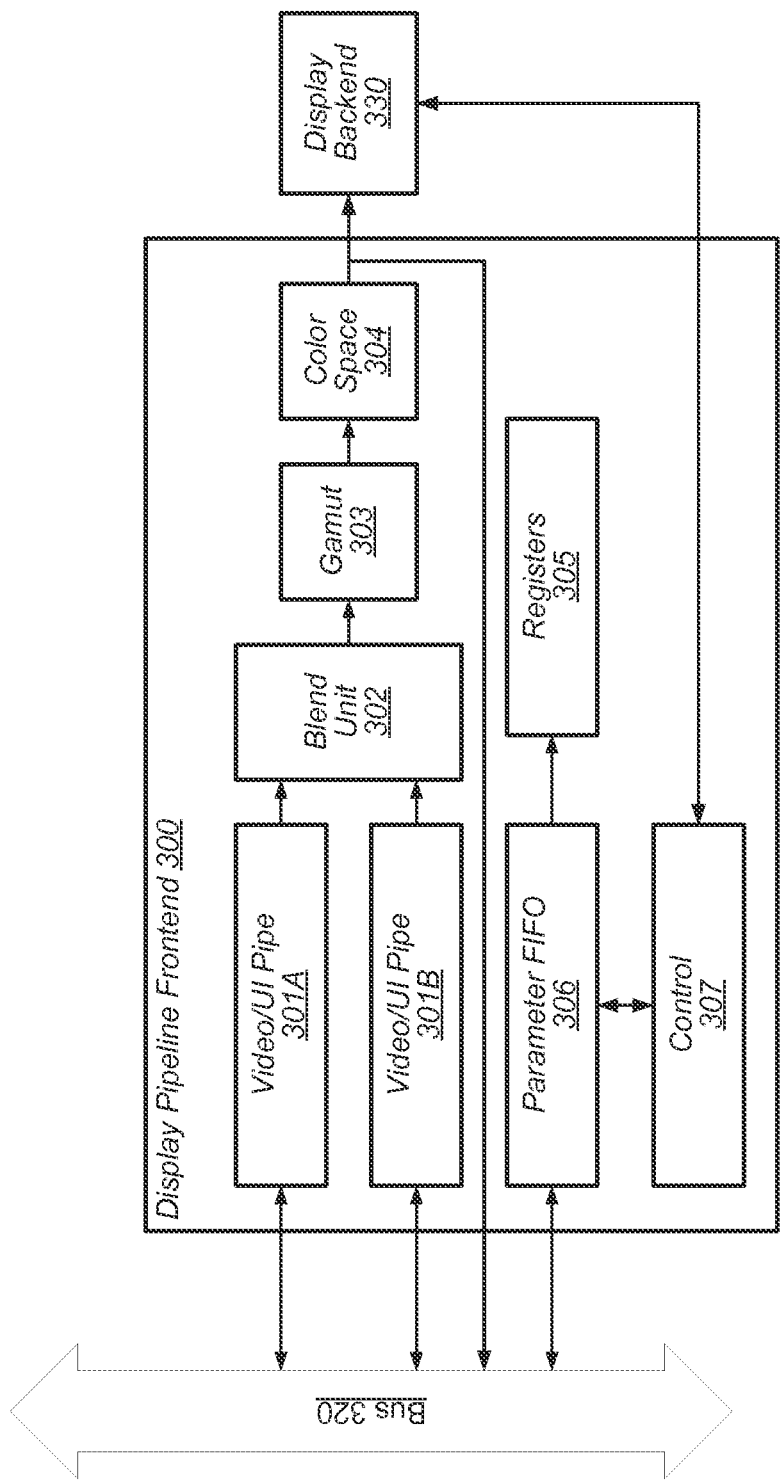
FIG. 3 is a block diagram illustrating one embodiment of a display pipeline frontend.

Referring now to FIG. 3, a block diagram of one embodiment of a display pipeline frontend 300 is shown. Display pipeline frontend 300 may represent the frontend portion of display pipe 116 of FIG. 1. Display pipeline frontend 300 may be coupled to a system bus 320 and to a display backend 330. In some embodiments, display backend 330 may directly interface to the display to display pixels generated by display pipeline frontend 300. Display pipeline frontend 300 may include functional sub-blocks such as one or more video/user interface (UI) pipelines 301A-B, blend unit 302, gamut adjustment block 303, color space converter 304, registers 305, parameter First-In First-Out buffer (FIFO) 306, and control unit 307. Display pipeline frontend 300 may also include other components which are not shown in FIG. 3 to avoid cluttering the figure.

System bus 320, in some embodiments, may correspond to communication fabric 127 from FIG. 1. System bus 320 couples various functional blocks such that the functional blocks may pass data between one another. Display pipeline frontend 300 may be coupled to system bus 320 in order to receive video frame data for processing. In some embodiments, display pipeline frontend 300 may also send processed video frames to other functional blocks and/or memory that may also be coupled to system bus 320. It is to be understood that when the term "video frame" is used, this is intended to represent any type of frame, such as an image, that can be rendered to the display.

The display pipeline frontend 300 may include one or more video/UI pipelines 301A-B, each of which may be a video and/or user interface (UI) pipeline depending on the embodiment. It is noted that the terms "video/UI pipeline" and "pixel processing pipeline" may be used interchangeably herein. In other embodiments, display pipeline frontend 300 may have one or more dedicated video pipelines and/or one or more dedicated UI pipelines. Each video/UI pipeline 301 may fetch a source image (or a portion of a source image) from a buffer coupled to system bus 320. The buffered source image may reside in a system memory such as, for example, system memory 112 from FIG. 1. Each video/UI pipeline 301 may fetch a distinct source image (or a portion of a distinct source image) and may process the source image in various ways, including, but not limited to, format conversion (e.g., YCbCr to ARGB), image scaling, and dithering. In some embodiments, each video/UI pipeline may process one pixel at a time, in a specific order from the source image, outputting a stream of pixel data, and maintaining the same order as pixel data passes through.

In one embodiment, when utilized as a user interface pipeline, a given video/UI pipeline 301 may support programmable active regions in the source image. The active regions may define the only portions of the source image to be displayed. In an embodiment, the given video/UI pipeline 301 may be configured to only fetch data within the active regions. Outside of the active regions, dummy data with an alpha value of zero may be passed as the pixel data.

Control unit 307 may, in various embodiments, be configured to arbitrate read requests to fetch data from memory from video/UI pipelines 301A-B. In some embodiments, the read requests may point to a virtual address. A memory management unit (not shown) may convert the virtual address to a physical address in memory prior to the requests being presented to the memory. In some embodiments, control unit 307 may include a dedicated state machine or sequential logic circuit. A general purpose processor executing program instructions stored in memory may, in other embodiments, be employed to perform the functions of control unit 307.

Blending unit 302 may receive a pixel stream from one or more of video/UI pipelines 301A-B. If only one pixel stream is received, blending unit 302 may simply pass the stream through to the next sub-block. However, if more than one pixel stream is received, blending unit 302 may blend the pixel colors together to create an image to be displayed. In various embodiments, blending unit 302 may be used to transition from one image to another or to display a notification window on top of an active application window. For example, a top layer video frame for a notification, such as, for a calendar reminder, may need to appear on top of, i.e., as a primary element in the display, despite a different application, an internet browser window for example. The calendar reminder may comprise some transparent or semi-transparent elements in which the browser window may be at least partially visible, which may require blending unit 302 to adjust the appearance of the browser window based on the color and transparency of the calendar reminder. The output of blending unit 302 may be a single pixel stream composite of the one or more input pixel streams.

The output of blending unit 302 may be sent to gamut adjustment unit 303. Gamut adjustment 303 may adjust the color mapping of the output of blending unit 302 to better match the available color of the intended target display. The output of gamut adjustment unit 303 may be sent to color space converter 304. Color space converter 304 may take the pixel stream output from gamut adjustment unit 303 and convert it to a new color space. Color space converter 304 may then send the pixel stream to display backend 330 or back onto system bus 320. In other embodiments, the pixel stream may be sent to other target destinations. For example, the pixel stream may be sent to a network interface for example. In some embodiments, a new color space may be chosen based on the mix of colors after blending and gamut corrections have been applied. In further embodiments, the color space may be changed based on the intended target display.

Display backend 330 may control the display to display the pixels generated by display pipeline frontend 300. Display backend 330 may read pixels at a regular rate from an output FIFO (not shown) of display pipeline frontend 300 according to a pixel clock. The rate may depend on the resolution of the display as well as the refresh rate of the display. For example, a display having a resolution of N×M and a refresh rate of R fps may have a pixel clock frequency based on N×M×R. On the other hand, the output FIFO may be written to as pixels are generated by display pipeline frontend 300.

Display backend 330 may receive processed image data as each pixel is processed by display pipeline frontend 300. Display backend 330 may provide final processing to the image data before each video frame is displayed. In some embodiments, display back end may include ambient-adaptive pixel (AAP) modification, dynamic backlight control (DPB), display panel gamma correction, and dithering specific to an electronic display coupled to display backend 330.

The parameters that display pipeline frontend 300 may use to control how the various sub-blocks manipulate the video frame may be stored in control registers 305. These registers may include, but are not limited to, setting the frame refresh rate, setting input and output frame sizes, setting input and output pixel formats, location of the source frames, and destination of the output (display backend 330 or system bus 320). Control registers 305 may be loaded by parameter FIFO 306.

Parameter FIFO 306 may be loaded by a host processor, a direct memory access unit, a graphics processing unit, or any other suitable processor within the computing system. In other embodiments, parameter FIFO 306 may directly fetch values from a system memory, such as, for example, system memory 112 in FIG. 1. Parameter FIFO 306 may be configured to update control registers 305 of display processor 300 before each source video frame is fetched. In some embodiments, parameter FIFO may update all control registers 305 for each frame. In other embodiments, parameter FIFO may be configured to update subsets of control registers 305 including all or none for each frame. A FIFO as used and described herein, may refer to a memory storage buffer in which data stored in the buffer is read in the same order it was written. A FIFO may be comprised of RAM or registers and may utilize pointers to the first and last entries in the FIFO.

It is noted that the display pipeline frontend 300 illustrated in FIG. 3 is merely an example. In other embodiments, different functional blocks and different configurations of functional blocks may be possible depending on the specific application for which the display pipeline is intended. For example, more than two video/UI pipelines may be included within a display pipeline frontend in other embodiments.

Figure 4:
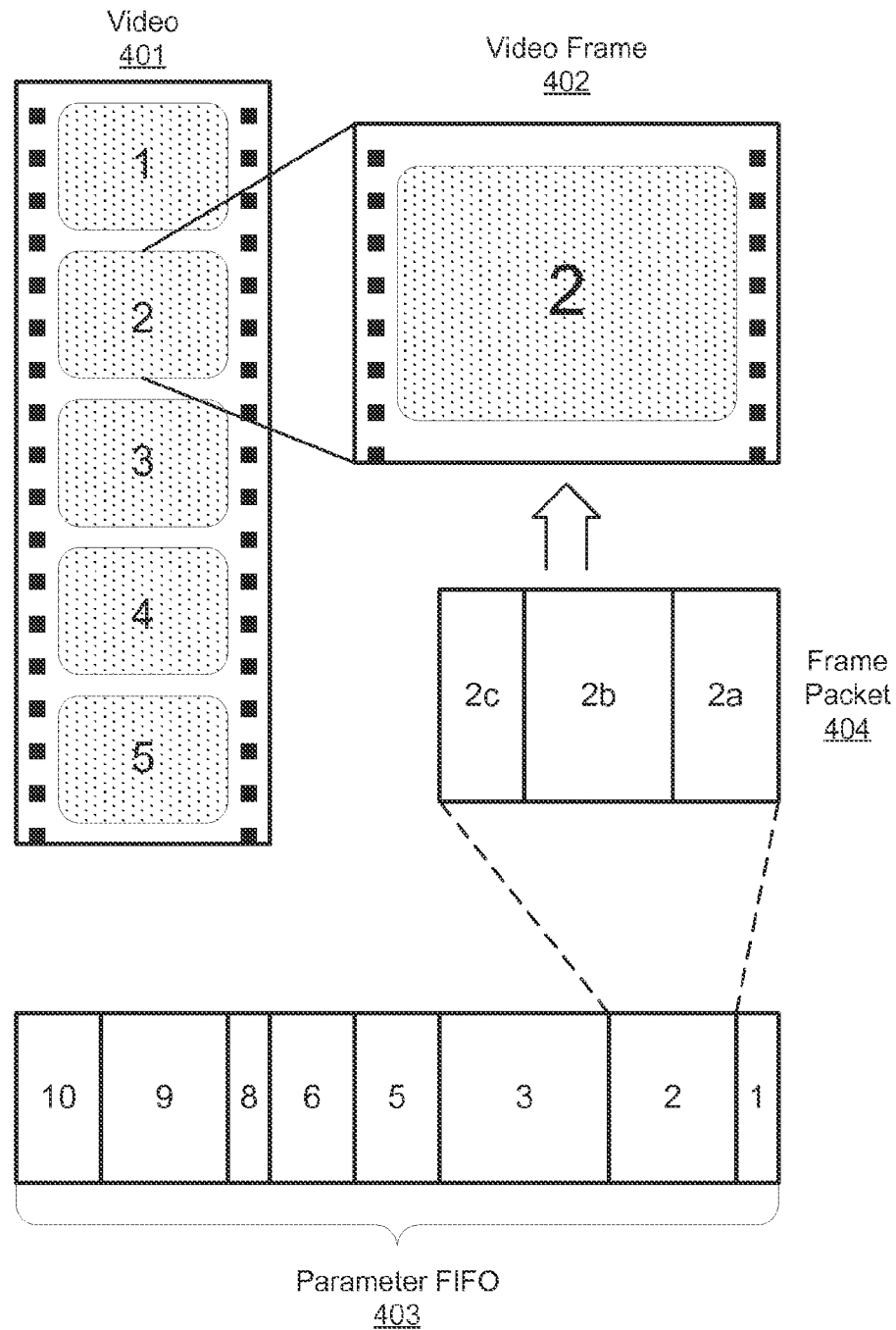
FIG. 4 is a block diagram illustrating one embodiment of a representation of a video file and a corresponding parameter FIFO.

Turning now to FIG. 4, a representation of a video file and a corresponding parameter FIFO are shown. In various embodiments, video 401 may represent a file containing a video clip in a format, such as, for example, Moving Pictures Expert Group-4 Part 14 (MP4), Advanced Video Coding (H.264/AVC), or Audio Video Interleave (AVI). Alternatively, Video 401 may be a series of still images, each image considered a frame, that may be displayed in timed intervals, commonly referred to as a slideshow. The images may be in a format such as Joint Photographic Experts Group (JPEG), raw image format (RAW), Graphics Interchange Format (GIF), or Portable Networks Graphics (PNG). For demonstration purposes, Video 401 is illustrated with five frames, numbered 1 through 5. However, any number of frames may be included in Video 401.

Video frame 402 may represent a single frame from video 401. In this example, video frame 402 is illustrated as frame number 2 of video 401. Video frame 402 may be a single image, in any of the formats previously discussed or any other suitable format. Video frame 402 may contain a list of pixel information in ARGB, YCbCr, or other suitable pixel format.

Parameter FIFO 403 may correspond to parameter FIFO 306 as illustrated in FIG. 3 and may have functionality as previously described. For demonstration purposes, parameter FIFO 403 is illustrated in FIG. 4 as holding eight frame packets, numbered 1 through 10, with 4 and 7 excluded. However, parameter FIFO 403 may hold as many frame packets as allowed by the size of the FIFO and the size of the frame packets. The number of the frame packet may correspond to the number of the video frame of video 401 for which the packet is intended to be used. Frame packets 4 and 7 (not shown) are excluded to illustrate that some video frames may not require a frame packet. In other embodiments, a frame packet may be required for each video frame. The size of each of the frame packets is shown to vary among the 10 examples to illustrate that the sizes may differ from frame packet to frame packet. In other embodiments, each frame packet may be a standard consistent size.

Frame packet 404 may represent a single frame packet stored in Parameter FIFO 403. Frame packet 404 may contain settings for various registers associated with a given video frame. In this example, frame packet 404 is shown as number 2 which may correspond to video frame 402, also illustrated as number 2. Frame packet 404 is illustrated as being divided into three sections, labeled 2*a*, 2*b*, and 2*c*, each representing one parameter command. A given frame packet may include any number of parameter commands, from zero to as many as may be stored in parameter FIFO 403. Each parameter command 2*a*-2*c* may contain a setting for one or more registers associated with video frame 402. Parameter commands 2*a*-2*c* may be of various lengths, based on the number of settings included in each command. In other embodiments, parameter commands 2*a*-2*c* may be standardized to one or more specific lengths.

In a system such as SOC 110 in FIG. 1, display pipe 116 may process respective portions of video frame 402 and frame packet 404 such that parameter commands 2*a*-2*c* are executed after video frame 1 of video 401 has been displayed and before video frame 402, is displayed, such that video frame 402 is displayed with parameters corresponding to parameter commands 2*a*-2*c*. These parameters may remain at their set values until another parameter command is executed that changes their currently set value. In some embodiments, the values of some or all parameters may be modified by commands not associated with parameter FIFO 403, such as, for example, operations transmitted by processor 114 of FIG. 1.

Figure 5:
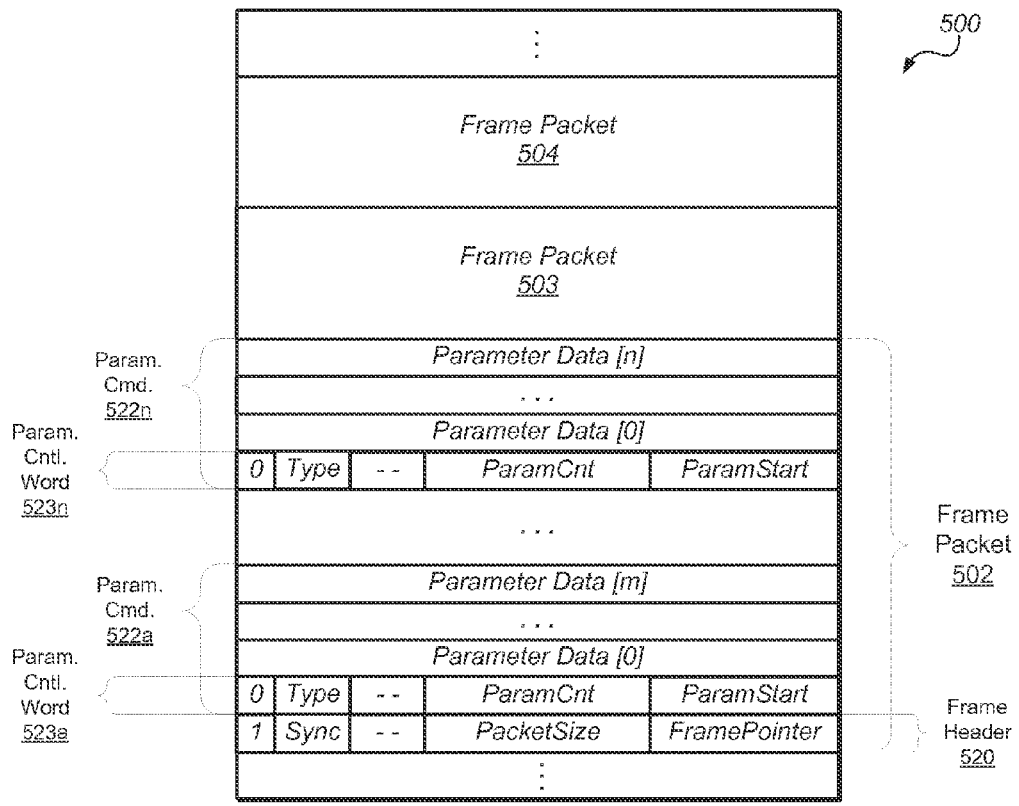
FIG. 5 is a block diagram illustrating one embodiment of parameter FIFO entries.

Referring now to FIG. 5, one embodiment of parameter FIFO entries 500 are shown. FIG. 5 illustrates the entries in a parameter FIFO, such as parameter FIFO 403 in FIG. 4. Parameter FIFO entries 500 may include several frame packets, as illustrated by frame packets 502, 503, and 504.

Frame packet 502 may, in some embodiments, include frame header 520 and be followed by a number of parameter commands, such as parameter command 522*a* through parameter command 522*n* as depicted in FIG. 5. A given frame packet may contain zero parameter commands up to the maximum number of commands that may fit into a FIFO of a given size. A frame packet with zero parameter commands may be referred to as a null parameter setting. Frame packet 502 may be read from parameter FIFO 403 when all frame packets written to parameter FIFO 403 before frame packet 502 have been read. When frame packet 502 is read, the first word read may be frame header 520.

Frame header 520 may contain information regarding the structure of frame packet 502. For example, frame header 520 may include a value corresponding to the size of frame packet 502. In some embodiments, the size may represent the number of bytes or words in the frame packet 502 and, in other embodiments, the size may represent the number of parameter commands. Frame header 520 may also include a value corresponding to the video frame for which it is intended. In various embodiments, frame header 520 may include a value to indicate that it is a frame header and/or a value to indicate frame packet 520 should be used with the next video frame to be processed rather than a specific video frame. This last feature may be useful in cases where a user adjusts a setting while a video is playing or an image is being displayed. For example, a user may change a brightness setting or a zoom factor with an expectation of the change being implemented as soon as possible rather than at a specific video frame.

Frame packet 502 may include zero or more parameter commands 522*a*-*n*. In some embodiments, a given parameter command, such as, for example, parameter command 522*a*, may include one parameter control word 523*a*. The parameter control word may define the structure of parameter command 522*a*. For example, parameter control word 523*a* may include a parameter count value to indicate how many parameter settings are included in the command. Parameter control word 523*a* may also include a parameter start value to indicate a starting register address for the parameter settings to be written. Some embodiments may also include a type value to indicate if parameter command 522*a* is internal, i.e., intended for registers within the display pipeline, such as display pipeline 116, or external, i.e., intended for registers outside display pipeline 116. In some embodiments, the parameter start value may only be used for internal parameter commands, where the registers may be addressed with an address value smaller than a complete data word. In such embodiments, external commands may use the first one or more words of the parameter data to form a starting address for the register(s) to be written with the remaining parameter data.

Each parameter setting within parameter command 522*a* may include one or more words of parameter data, shown in FIG. 5 as parameter data [0] through parameter data [m]. The number of parameter data words included in parameter command 522*a* may depend on the type of parameter command, internal or external, and the number of registers to be written by parameter command 522*a*. In various embodiments, parameter commands 522 may include various numbers of parameter data or may be standardized to a specific number of parameter data.

It is noted that the descriptions of frame packets, video frames and the parameter FIFO in FIG. 4 and FIG. 5 are merely examples. In other embodiments, the structure of a frame packet may include multiple words for header rather than the single word illustrated in FIG. 5, and a header may not be the first word within a given frame packet. In various embodiments, frame packets and parameter commands may be of a fixed length rather than various lengths as illustrated in FIGS. 4 and 5.

Figure 6:
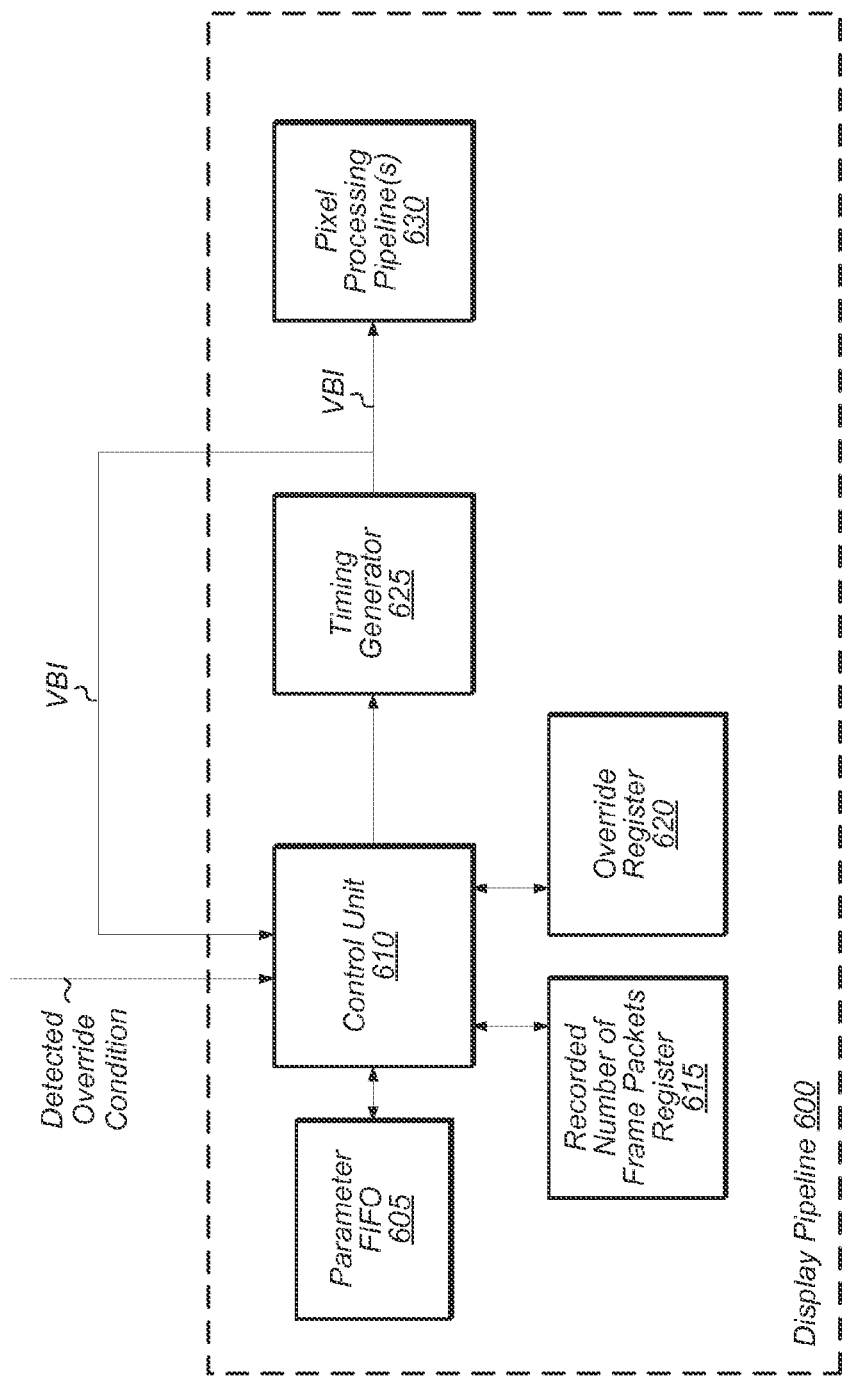
FIG. 6 is a block diagram illustrating another embodiment of a display pipeline.

Referring to FIG. 6, a block diagram of another embodiment of a display pipeline 600 is shown. Display pipeline 600 may include parameter FIFO 605, control unit 610, recorded number of frame packets register 615, override register 620, timing generator 625, and pixel processing pipeline(s) 630. It should be understood that display pipeline 600 may include additional logic which is not shown to avoid obscuring the figure.

Timing generator 625 may be configured to generate the VBI signal at the frame refresh rate specified by control unit 610. In some embodiments, when operating in reduced frame refresh rate mode, timing generator 625 may be configured to extend the vertical blanking period by one or more full frames. In other embodiments, timing generator 625 may be configured to extend the vertical blanking period by a portion of one or more frames (i.e., a non-integer number of frames) when operating in reduced frame refresh rate mode.

Control unit 610 may be configured to receive an indication when a condition (e.g., touch event, phone call, push notification) has been detected for overriding the reduced frame refresh rate for driving frames to the display. Depending on the embodiment, the indication may be generated by a touch screen controller, processor, or other control unit. The reduced frame refresh rate may be specified in one or more frame packets stored in parameter FIFO 605. When control unit 610 receives the indication that a given condition has been detected, control unit 610 may be configured to determine the number of frame packets stored in parameter FIFO 605 and to record this number in register 615. Control unit 610 may also set override register 620 to indicate that the reduced frame refresh rate will be overridden for the number of frames specified in register 615.

Control unit 610 may utilize the standard frame refresh rate (e.g., 60 fps) for the subsequent number of frames specified in register 615, and control unit 610 may convey an indication of the standard frame refresh rate to timing generator 625. Timing generator 625 may convey the generated VBI signal to control unit 610, pixel processing pipeline(s) 630, and one or more other logical units. When the recorded number of frames have been processed and driven to the display, control unit 610 may exit the override mode and return to driving frames to the display at the frame refresh rate specified in the frame packets stored in parameter FIFO 605.

Figure 7:
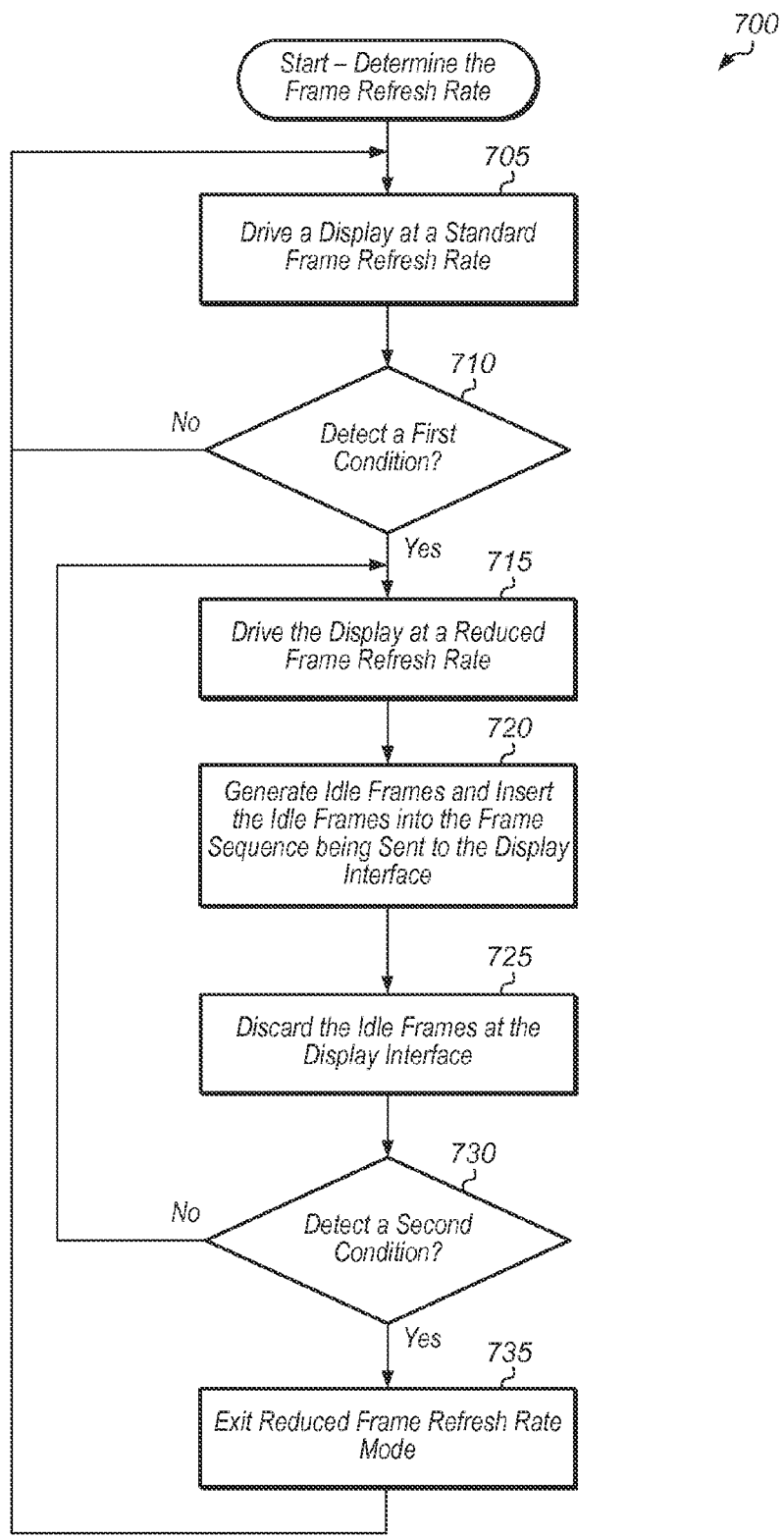
FIG. 7 is a generalized flow diagram illustrating one embodiment of a method for determining the frame refresh rate.

Referring now to FIG. 7, one embodiment of a method 700 for determining the frame refresh rate is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, and/or display pipelines described herein may be configured to implement method 700.

A display pipeline of a host apparatus may be configured to drive a display at a standard frame refresh rate during normal operations (block 705). The standard frame refresh rate may be 'M' frames per second (fps), wherein 'M' is a positive integer. In one embodiment, 'M' may be 60 fps, although the value of 'M' may vary in other embodiments. Depending on the embodiment, the host apparatus may be a mobile device (e.g., tablet, smart phone), wearable device, computer, or other computing device.

The apparatus may be configured to determine if a first condition for operating the display pipeline at a reduced frame refresh rate has been detected (conditional block 710). The reduced frame refresh rate may be 'N' fps, wherein 'N' is a positive integer, and wherein 'N' is less than 'M'. Depending on the embodiment, the first condition may be any of various detected events or conditions. For example, the first condition may be detecting that the user interface is static. In this case, driving the display at a reduced frame refresh rate would not impact the user's viewing experience since the display is not changing. Alternatively, the first condition may be detecting that the content being displayed is being rendered at a reduced frame refresh rate. For example, if a video or game can only be rendered at 30 frames per second (fps), then the frame refresh rate may be reduced to 30 frames per second, from the standard refresh rate of 60 frames per second, while this video or game is being displayed. Also, in other embodiments, the first condition may be when the apparatus is operating in a power-savings mode, when the battery level has fallen below a threshold, or when another power-related condition has been detected.

If the first condition has been detected (conditional block 710, "yes" leg), then the display pipeline may be configured to drive the display at the reduced frame refresh rate (block 715). If the first condition has not been detected (conditional block 710, "no" leg), then method 700 may return to block 705 with the display pipeline operating in standard frame refresh rate mode.

To drive the display at a reduced frame refresh rate, the display pipeline may be configured to generate idle frames and insert the idle frames into the frame sequence being sent to the display interface (block 720). In response to receiving the idle frames, the display interface may be configured to discard the idle frames and display only the active frames (block 725).

While operating in reduced frame refresh rate mode, the apparatus may be configured to determine if a second condition for exiting the reduced frame refresh mode has been detected (conditional block 730). In various embodiments, the second condition may be a touch event, the user receiving a phone call, a push notification, and/or any of various other conditions. If the second condition has been detected (conditional block 730, "yes" leg), then the display pipeline may be configured to exit reduced frame refresh rate mode (block 735). In one embodiment, the display pipeline may be configured to record the number of stored frame packets in the parameter FIFO and override the reduced frame refresh rate for this number of frames when exiting reduced frame refresh rate mode. After block 735, method 700 may return to block 705 with the display pipeline driving the display at the standard frame refresh rate. If the second condition has not been detected (conditional block 730, "no" leg), then method 700 may return to block 715 with display pipeline continuing to drive the display at the reduced frame refresh rate.

Figure 8:
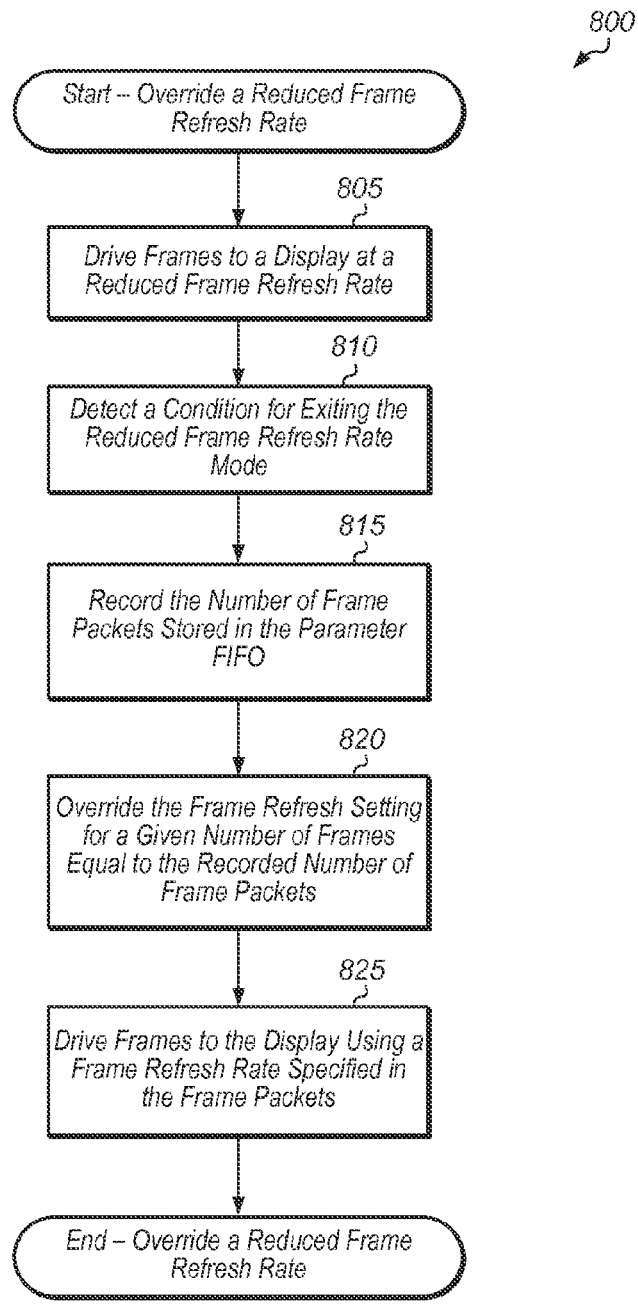
FIG. 8 is a generalized flow diagram illustrating one embodiment of a method for overriding a reduced frame refresh rate.

Turning now to FIG. 8, one embodiment of a method 800 for overriding a reduced frame refresh rate is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems, apparatuses, and display pipelines described herein may be configured to implement method 800.

In one embodiment, the display pipeline of an apparatus or system may be driving frames to a display at a reduced frame refresh rate (block 805). Next, the apparatus or system may detect a condition for exiting the reduced frame refresh rate mode (block 810). In various embodiments, any of a plurality of various conditions may be detected for exiting the reduced frame refresh rate mode. For example, the condition may be a touch event being detected, a phone call or push notification being received, or any of various other events.

In response to detecting the condition for exiting the reduced frame refresh rate mode, the display pipeline may be configured to record the number of frame packets stored in the parameter FIFO, wherein the frame packets include configuration data for subsequent frames to be displayed (block 815). The frame packets may include a setting for the desired frame refresh rate at which the corresponding frames should be displayed. This setting may specify that the display pipeline is to display a corresponding frame at the reduced frame refresh rate. However, the display pipeline may be configured to override the frame refresh rate setting for a given number of frames, wherein the given number is equal to the recorded number of frame packets (block 820). After the given number of frames have been processed, the display pipeline may return to driving the frames to the display using a frame refresh rate as specified by the newly received frame packets (block 825). After block 825, method 800 may end.

Figure 9:
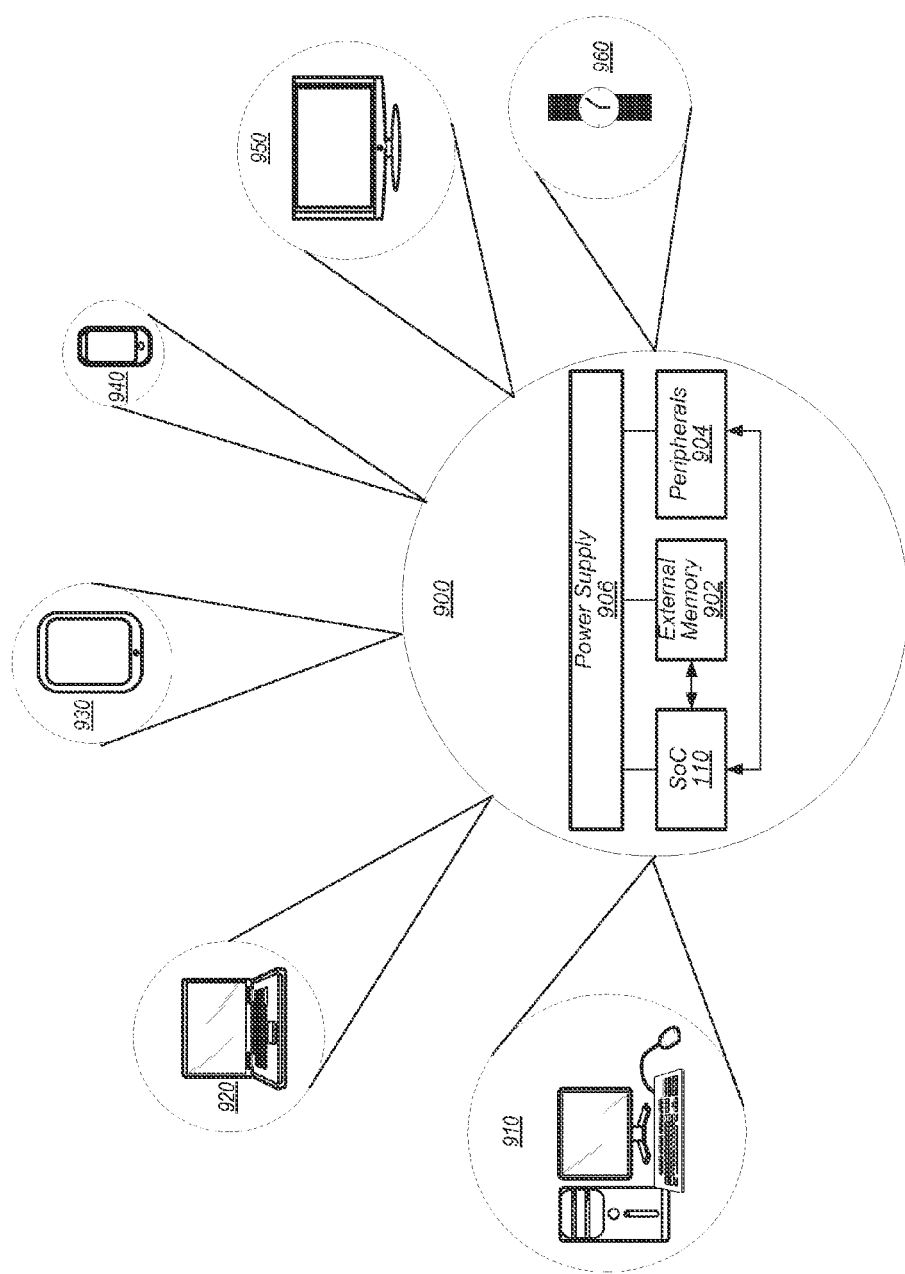
FIG. 9 is a block diagram of one embodiment of a system.

Referring next to FIG. 9, a block diagram of one embodiment of a system 900 is shown. As shown, system 900 may represent chip, circuitry, components, etc., of a desktop computer 910, laptop computer 920, tablet computer 930, cell phone 940, television 950 (or set top box configured to be coupled to a television), wrist watch or other wearable item 960, or otherwise. Other devices are possible and are contemplated. In the illustrated embodiment, the system 900 includes at least one instance of SoC 110 (of FIG. 1) coupled to an external memory 902.

SoC 110 is coupled to one or more peripherals 904 and the external memory 902. A power supply 906 is also provided which supplies the supply voltages to SoC 110 as well as one or more supply voltages to the memory 902 and/or the peripherals 904. In various embodiments, power supply 906 may represent a battery (e.g., a rechargeable battery in a smart phone, laptop or tablet computer). In some embodiments, more than one instance of SoC 110 may be included (and more than one external memory 902 may be included as well).

The memory 902 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with SoC 110 in a chip-on-chip configuration, a package-on-package configuration, or a multi-chip module configuration.

The peripherals 904 may include any desired circuitry, depending on the type of system 900. For example, in one embodiment, peripherals 904 may include devices for various types of wireless communication, such as wifi, Bluetooth, cellular, global positioning system, etc. The peripherals 904 may also include additional storage, including RAM storage, solid state storage, or disk storage. The peripherals 904 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A display pipeline comprising:
 a display backend configured to:
  drive a display at a first frame refresh rate when operating in a first mode; and
  drive the display at a second frame refresh rate when operating in a second mode, the second frame refresh rate being lower than the first frame refresh rate; and
 a display frontend, wherein responsive to detecting a condition for overriding the second frame refresh rate with a third frame refresh rate different from the second frame refresh rate, the display frontend is configured to:
  determine a number of frame packets stored in parameter buffer, wherein each frame packet stored in the parameter buffer includes an indication that the second frame rate is to be used for processing the corresponding frame; and
  process each of the frame packets at the third frame refresh rate for a number of frames equal to the number of frame packets, wherein the third frame refresh rate at which a given frame is processed is different from the second frame rate specified for the given frame.

2. The display pipeline as recited in claim 1, wherein the display frontend further comprises internal pixel-processing pipelines, and wherein the display frontend is further configured to stop processing frame packets at the third frame refresh rate and begin processing packets at the second frame refresh rate responsive to determining said number of frames equal to the number of frame packets have been processed by the internal pixel-processing pipelines at the third frame refresh rate.

3. The display pipeline as recited in claim 1, wherein the condition for overriding the second frame refresh rate comprises detecting a touch event on the display.

4. The display pipeline as recited in claim 1, wherein the display pipeline is configured to drive the display at the second frame refresh rate by generating one or more idle frames for each active frame.

5. The display pipeline as recited in claim 1, wherein the third frame refresh rate is equal to the first frame refresh rate.

6. The display pipeline as recited in claim 5, wherein the first frame refresh rate is 60 frames per second.

7. A computing system comprising:
 a display; and
 a display pipeline configured to:
  drive a display at a first frame refresh rate when operating in a first mode; and
  drive the display at a second frame refresh rate when operating in a second mode, the second frame refresh rate being lower than the first frame refresh rate;
  responsive to detecting a condition for overriding the second frame refresh rate with a third frame refresh rate different from the second frame refresh rate:
   determine a number of frame packets stored in a parameter buffer, wherein each frame packet stored in the parameter buffer includes an indication that the second frame rate is to be used for processing the corresponding frame; and
   process each of the number of frame packets at third frame refresh rate for a number of frames equal to the number of frame packets, wherein the third frame refresh rate at which a given frame to be displayed is processed is different from the second frame rate specified for the given frame.

8. The computing system as recited in claim 7, wherein the display pipeline is further configured to stop processing frame packets at the third frame refresh rate and begin processing packets at the second frame refresh rate responsive to determining said number of frames equal to the number of frame packets have been processed at the third frame refresh rate.

9. The computing system as recited in claim 7, wherein the condition for overriding the second frame refresh rate is detecting a touch event on the display.

10. The computing system as recited in claim 7, wherein the display pipeline is configured to drive the display at the second frame refresh rate by generating one or more idle frames for each active frame.

11. The computing system as recited in claim 7, wherein the third frame refresh rate is equal to the first frame refresh rate.

12. The computing system as recited in claim 11, wherein the third frame refresh rate is 60 frames per second.

13. A method comprising:
driving a display at a first frame refresh rate when operating in a first mode;
driving the display at a second frame refresh rate when operating in a second mode, the second frame refresh rate being lower than the first frame refresh rate;
responsive to detecting a condition for overriding the second frame refresh rate with a third frame refresh rate different from the second frame refresh rate:
determining a number of frame packets to be processed and currently stored in a parameter buffer, wherein each frame packet stored in the parameter buffer includes an indication that the second frame rate is to be used for processing the corresponding frame; and
processing each of the number of frame packets for a frame at the third frame refresh rate for a number of frames equal to the number of frame packets, wherein the third frame refresh rate at which a given frame to be displayed is processed is different from the second frame rate specified for the given frame.

14. The method as recited in claim 13, further comprising stopping processing of frame packets at the third frame refresh rate and beginning processing of frame packets at the second frame refresh rate responsive to determining said number of frames equal to the number of frame packets have been processed at the third frame refresh rate.

15. The method as recited in claim 13, wherein the condition for overriding the second frame refresh rate is detecting a touch event on the display.

16. The method as recited in claim 13, further comprising driving the display at the second frame refresh rate by generating one or more idle frames for each active frame.

17. The method as recited in claim 13, wherein the third frame refresh rate is greater than the second frame refresh rate.

* * * * *